US012778150B2

(12) United States Patent
Yoakum

(10) Patent No.: US 12,778,150 B2
(45) Date of Patent: Nov. 3, 2026

(54) SMOKING FRUIT

(71) Applicant: Samuel Yoakum, Knoxville, TN (US)

(72) Inventor: Samuel Yoakum, Knoxville, TN (US)

(73) Assignee: Smoaked, LLC, Knoxville, TN (US)

( * ) Notice: Subject to any disclaimer, the term of this patent is extended or adjusted under 35 U.S.C. 154(b) by 153 days.

(21) Appl. No.: 18/496,135

(22) Filed: Oct. 27, 2023

(65) Prior Publication Data

US 2024/0156115 A1 May 16, 2024

Related U.S. Application Data

(60) Provisional application No. 63/419,831, filed on Oct. 27, 2022.

(51) Int. Cl.
*A23B 4/048* (2006.01)
*A23B 7/005* (2006.01)

(52) U.S. Cl.
CPC ............ *A23B 4/048* (2013.01); *A23B 7/0053* (2013.01)

(58) Field of Classification Search
CPC ................................ A23B 7/0053; A23B 7/08
See application file for complete search history.

(56) References Cited

PUBLICATIONS

Lauren "Sweet & Savory Smoked Strawberry Sauce" Bon Appeteach May 31, 2020, pp. 1-12 https://www.bonappeteach.com/smoked-strawberry-sauce/ (Year: 2020).*

Resha "Smoked Cherry BBQ Sauce" CarnalDish Sep. 2018 pp. 1-21 https://www.carnaldish.com/recipes/smoked-cherry-bbq-sauce/ (Year: 2018).*

Roberts, Pamela "Sweet Pickle Chips" Spoon Feast Jul. 2013 pp. 1-14 https://spoonfeast.com/2013/07/31/sweet-pickle-chips/ (Year: 2013).*

Nepas "Cold Smoked Dill Pickles" Smoking MeatForums.com Oct. 2020 pp. 1-5 https://www.smokingmeatforums.com/threads/cold-smoked-dill-pickles.302489/ (Year: 2020).*

Full Boar "Bonfire Sweet Heat Smoked Pickles Recipe" Sep. 28, 2020 pp. 1-4 https://fullboarbbqproducts.com/blogs/news/bonfire-sweet-heat-smoked-pickles-recipe (Year: 2020).*

Lovejoy "Smoking Fruits and Vegetables" Aug. 29, 2016 Green Gardening with Lovejoy pp. 1-3 https://www.loghouseplants.com/blogs/greengardening/2016/08/smoking-fruits-and-vegetables/ (Year: 2016).*

* cited by examiner

*Primary Examiner* — Kelly J Bekker
(74) *Attorney, Agent, or Firm* — Pitts Lake, LLC

(57) ABSTRACT

Fruit and warm water are added to a vessel in a smoker, together with brown sugar and/or white sugar. The mixture of fruit, water, and sugar is smoked in the smoker until the fruit softens to the touch; the smoking step generally is performed such that the water is maintained at a temperature from 50° C. to 80° C. (approx. 122° F. to 176° F.) and generally lasts about two hours. The fruit is then simmered in a syrup formed from the water and sugar, with the syrup covering the fruit during the simmering step; generally, the fruit and syrup are simmered until the syrup begins to boil, typically at approximately 104° C. (219° F.). After simmering, the fruit and syrup are optionally separated. The process produces both treated fruit and syrup possessing a smoky flavor.

5 Claims, 1 Drawing Sheet

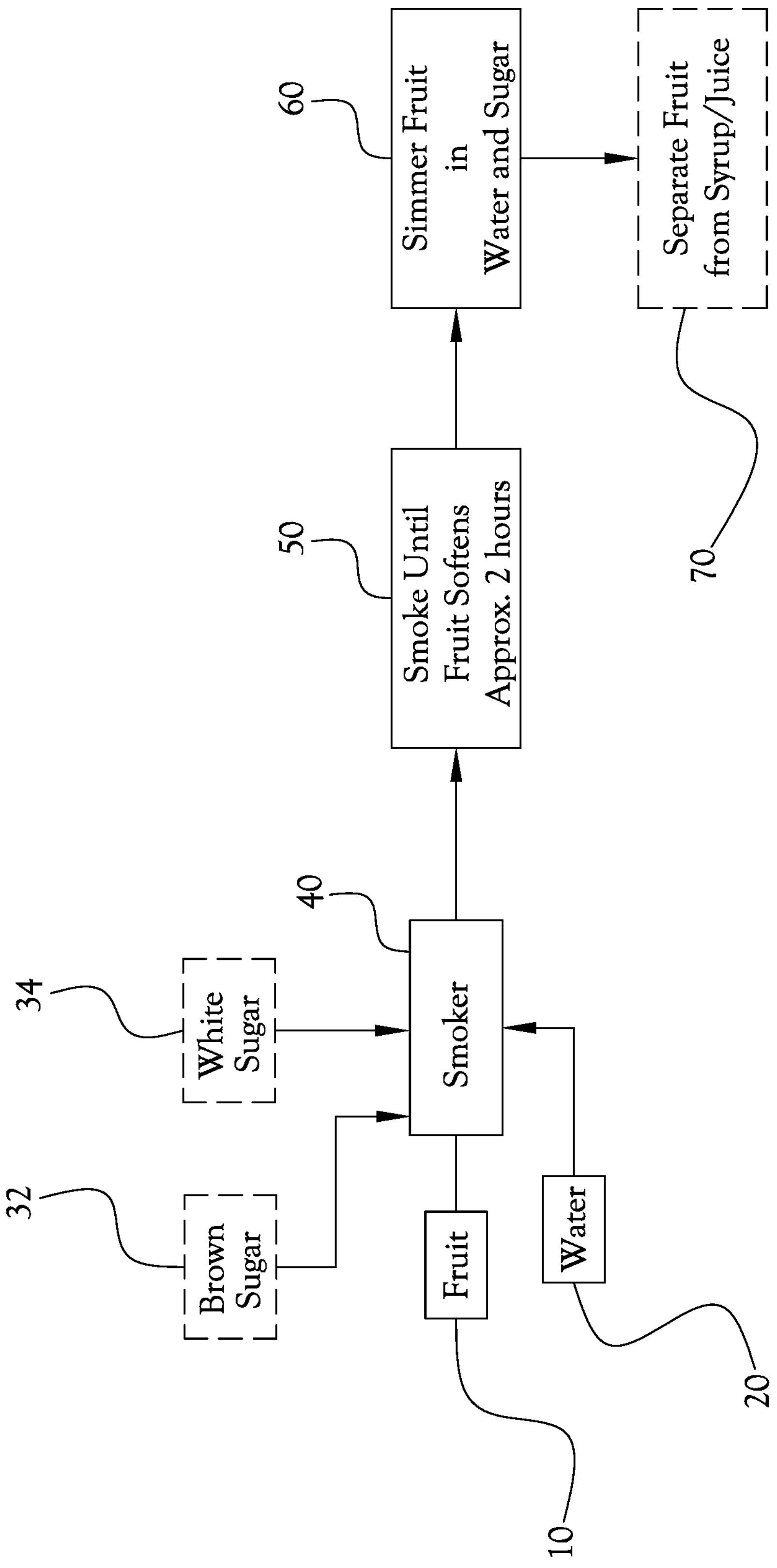
Fruit
10
Water
20
Brown Sugar
32
White Sugar
34
Smoker
40
Smoke Until Fruit Softens Approx. 2 hours
50
Simmer Fruit in Water and Sugar
60
Separate Fruit from Syrup/Juice
70

SMOKING FRUIT

CROSS-REFERENCE TO RELATED APPLICATIONS

This application claims the benefit of the filing date of U.S. Provisional Patent Application Ser. No. 63/419,831, filed Oct. 27, 2022 and entitled "Smoking Fruit," the entire content of which is incorporated herein by reference.

STATEMENT REGARDING FEDERALLY SPONSORED RESEARCH OR DEVELOPMENT

Not Applicable

BACKGROUND OF THE INVENTION

The present invention pertains generally to methods for preparing fruits and fruit derivatives and, more particularly, to methods for smoking fruit to derive preserves and other fruit derivates with a particular flavor profile.

In recent years, the process of smoking foods has become increasingly utilized both at home and with commercial products. Typically smoking techniques are applied to meat, and occasionally to other soft, solid foods such as cheese. Produce is typically avoided as the smoking process not only blackens vegetables, it also wilts and shrivels them. None of these results are desirable.

SUMMARY OF THE INVENTION

Disclosed herein are various example embodiments of the present general inventive concept. In some example embodiments, a method for smoking fruit comprises adding fruit, water, and sugar to a vessel; smoking the fruit, water, and sugar in the vessel until the fruit softens; and simmering the fruit in syrup of water and sugar until the syrup boils, said syrup covering the fruit during the simmering process.

In some embodiments, during the smoking step the water is maintained at a temperature from 50 degrees Celsius to 80 degrees Celsius.

In some embodiments, the sugar includes brown sugar. In some embodiments, the sugar includes white sugar. In some embodiments, the fruit includes cherries. In some embodiments, the fruit is selected from the group consisting of cherries, raspberries, blackberries, peaches, and strawberries. In some embodiments, the fruit includes pickled fruit. In some embodiments, the fruit includes pickled cucumbers.

In some example embodiments of the present general inventive concept, a method for smoking fruit comprises adding fruit, water, and sugar to a vessel; exposing the fruit, water, and sugar in the vessel to smoke and heat in smoker oven until the fruit softens; and simmering the fruit in syrup of water and sugar until the syrup boils, said syrup covering the fruit during the simmering process.

In some embodiments, during the smoking step the water is maintained at a temperature from 50 degrees Celsius to 80 degrees Celsius.

In some embodiments, the sugar includes brown sugar. In some embodiments, the sugar includes white sugar. In some embodiments, the fruit is selected from the group consisting of cherries, raspberries, blackberries, peaches, and strawberries. In some embodiments, the fruit includes pickled fruit. In some embodiments, the fruit includes pickled cucumbers.

BRIEF DESCRIPTION OF THE DRAWING FIGURES

The above-mentioned and additional features of the invention will become more clearly understood from the following detailed description of the invention read together with the drawings in which:

FIG. 1 is a view of a flow diagram illustrating in general terms one example embodiment of the present general inventive concept.

DETAILED DESCRIPTION

Processes according to the present general inventive concept generally involve smoking liquids (e.g., sugar and water, salt and water, syrup, or brine), typically with produce (cherries, berries, pickles, peaches, etc.) for the purpose of creating a garnish, glaze, filling, or syrup.

The following detailed description is provided to assist the reader in gaining a comprehensive understanding of the structures and fabrication techniques described herein. Accordingly, various changes, modification, and equivalents of the structures and fabrication techniques described herein will be suggested to those of ordinary skill in the art. The progression of fabrication operations described are merely examples, however, and the sequence type of operations is not limited to that set forth herein and may be changed as is known in the art, with the exception of operations necessarily occurring in a certain order. Also, description of well-known functions and constructions may be simplified and/or omitted for increased clarity and conciseness.

Note that spatially relative terms, such as "up," "down," "right," "left," "beneath," "below," "lower," "above," "upper" and the like, may be used herein for ease of description to describe one element or feature's relationship to another element(s) or feature(s) as illustrated in the FIGURES. Spatially relative terms are intended to encompass different orientations of the device in use or operation in addition to the orientation depicted in the figures. For example, if the device in the FIGURES is turned over or rotated, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Various example embodiments of the present general inventive concept provide methods of smoking fruit and fruit-adjacent items in a water mixture in order to derive an end product with a distinctive flavor profile. For example, one exemplary method involves mixing cherries and sugar in water, then applying the smoking process for several hours to actually combine the smoke into the ingredients, thereby imparting a rich, smoky flavor to the end product food items.

Further, various example embodiments of the present general inventive concept can be applied to many types of produce (fruit or veg) in liquid with a solute. For instance, methods and processes as described herein work just as well for cherries in sugar water as they do for pickles in brine.

In one example embodiment of the present general inventive concept, approximately 1 pound of cherries are mixed in a pan with 1-2 cups of warm water, along with 1 cup of brown sugar and 1 cup of white sugar. The pan with the mixture of cherries, water, and sugar is placed in a smoker, and the mixture of cherries, water, and sugar is smoked until the fruit softens to the touch; the smoking step generally involves “hot smoking” and is performed such that the water is maintained at a temperature from 50° C. to 80° C. (approx. 122° F. to 176° F.); the smoking step generally lasts approximately two hours. Thereafter, the mixture of cherries, water, and sugar fruit is then transferred to a sauce pan and simmered; the water and sugar by this time generally have formed a syrup. The syrup covering the cherries in the sauce pan during the simmering step. Generally, the cherries and syrup are simmered until the syrup begins to boil, typically at approximately 104° C. (219° F.), although the exact temperature at which the syrup boils will vary depending on the thickness and material composition of the syrup. After simmering, the fruit and syrup are optionally separated. The process results in both treated fruit and syrup impregnated with a smoky flavor.

FIG. 1 shows a flow diagram illustrating in general terms an example method or process according to one example embodiment of the present general inventive concept. As shown in FIG. 1, fruit 10 and (warm) water 20 are added to a vessel (such as a pan) in a smoker 40; brown sugar 32 and/or white sugar 34 are also added to the mixture in the smoker 40. The mixture of fruit, water, and sugar is smoked in the smoker 50 until the fruit softens to the touch; the smoking step generally is performed such that the water is maintained at a temperature from 50° C. to 80° C. (approx. 122° F. to 176° F.) and generally lasts about two hours. The fruit is then simmered 60 in a syrup formed from the water and sugar, with the syrup covering the fruit during the simmering step; generally, the fruit and syrup are simmered until the syrup begins to boil, typically at approximately 104° C. (219° F.), although the exact temperature at which the syrup boils will vary depending on the thickness and material composition of the syrup. After simmering, the fruit and syrup are optionally separated 70. The process produces both treated fruit and syrup possessing a smoky flavor.

The process described herein is compatible with a range and number of fruits. In some embodiments, the fruit that is smoked is selected from the group consisting of cherries, raspberries, blackberries, peaches, and strawberries. In some embodiments, the fruit includes pickled fruit. In some embodiments, the fruit includes pickled cucumbers.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant’s general inventive concept.

Moreover, in the description above, for the purposes of explanation, numerous specific details have been set forth in order to provide a thorough understanding of the embodiments. It will be apparent however, to one skilled in the art, that one or more other embodiments may be practiced without some of these specific details. The particular embodiments described are not provided to limit the invention but to illustrate it. The scope of the invention is not to be determined by the specific examples provided above but only by the claims below. It should also be appreciated that reference throughout this specification to “one embodiment”, “an embodiment”, “one or more embodiments”, or “different embodiments”, for example, means that a particular feature may be included in the practice of the invention. Similarly, it should be appreciated that in the description various features are sometimes grouped together in a single embodiment, FIGURE, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the detailed description are hereby expressly incorporated into this detailed description, with each claim standing on its own as a separate embodiment of the invention.

What is claimed is:

1. A method of making a smoked fruit product comprising:

adding fruit, water, and sugar to a vessel, wherein the sugar is brown sugar, white sugar, or a combination thereof;

smoking the fruit, the water, and the sugar in the vessel for two hours while the water is maintained at a temperature of 50° C. to 80° C. to form a smoked fruit and syrup, the syrup comprising the water and the sugar;

transferring the smoked fruit and the syrup into a saucepan;

simmering the smoked fruit in the syrup in the saucepan until the syrup reaches a temperature of about 104° C., said syrup covering the smoked fruit during the simmering; and separating the smoked fruit and the syrup to produce the smoked fruit product.

2. The method of claim 1, wherein adding the fruit includes adding cherries.

3. The method of claim 1, wherein adding the fruit includes adding fruit selected from the group consisting of cherries, raspberries, blackberries, peaches, and strawberries.

4. The method of claim 1, wherein adding the fruit includes adding pickled fruit.

5. The method of claim 4, wherein the pickled fruit comprises pickled cucumbers.

* * * * *